United States Patent [19]

Lay et al.

[11] Patent Number: 5,483,455
[45] Date of Patent: Jan. 9, 1996

[54] METHOD AND APPARATUS FOR DETERMINING THE LOCATION OF A VEHICLE

[75] Inventors: Norman K. Lay, Peoria; Carl A. Kemner, Peoria Heights; Joel L. Peterson, Peoria; William E. Allen, Peoria; Richard B. League, Peoria, all of Ill.

[73] Assignee: Caterpillar Inc., Peoria, Ill.

[21] Appl. No.: 371,657

[22] Filed: Jan. 11, 1995

Related U.S. Application Data

[63] Continuation of Ser. No. 942,000, Sep. 8, 1992, abandoned.
[51] Int. Cl.$^6$ ................................................. G01C 21/00
[52] U.S. Cl. ................. 364/448; 364/449; 364/424.02
[58] Field of Search ............................ 364/448, 424.02, 364/450, 449, 461, 571.02; 180/167, 168, 169

[56] References Cited

U.S. PATENT DOCUMENTS

| | | | |
|---|---|---|---|
| 4,060,809 | 11/1977 | Baghdady | 343/112 R |
| 4,106,023 | 8/1978 | Baghdady | 343/106 D |
| 4,224,507 | 9/1980 | Gendreu | 235/412 |
| 4,225,226 | 9/1980 | Davidson et al. | 356/1 |
| 4,347,573 | 8/1982 | Friedland | 364/453 |

(List continued on next page.)

FOREIGN PATENT DOCUMENTS

| | | |
|---|---|---|
| 0006448A1 | 1/1980 | European Pat. Off. . |
| 0236614A2 | 9/1987 | European Pat. Off. . |
| 2526181 | 4/1982 | France . |
| 1260761 | 1/1972 | United Kingdom . |
| 1528180 | 10/1978 | United Kingdom . |
| 2025722 | 1/1980 | United Kingdom . |
| 2144007 | 2/1985 | United Kingdom . |
| 2169725 | 7/1986 | United Kingdom . |
| WO85/05474 | 12/1985 | WIPO . |
| WO87/07403 | 3/1987 | WIPO . |

OTHER PUBLICATIONS

Stevens et al., *Aircraft Control and Simulation*, John Wiley & Sons, Inc., N.Y., 1992, pp. 8–10.
Article–Aerospace & Electronic System vol. AES–23 No. 1 "Decentralized Filtering and Redundancy Management For Multisensor Navigation".
Appication Ser. No. 08/104,867 filed Aug. 10, 1993 by Malcolm T. Roberts et al. entitled "Apparatus and Method For Identifying Scanned Reflective Anonymous Targets".
Article entitled "Position Finding of Ground Vehicle by Use of Laser Beam and Corner–Cubes" by T. Tsumura et al. published in 1982 IEEE.
Article entitled "NDC Laser–Laser Guidance Technology" published by NDC Automation, Inc.
Article entitled "Blanche: An autonomous robot vehicle for structured environments" by Ingemar J. Cox, AT&T Bell Laboratories, pp. 978–982, dated 1988.
Article entitled "Obstacle Avoidance Perception Processing For the Autonomous Land Vehicle", by R. Terry Dunlay, (List continued on next page.)

*Primary Examiner*—Kevin J. Teska
*Assistant Examiner*—Stephen J. Walder, Jr.
*Attorney, Agent, or Firm*—Steven R. Janda; Alan J. Hickman

[57] ABSTRACT

Vehicle navigation systems typically include devices for determining the location of the vehicle. In many situations it is advantageous to improve the resolution of such devices or to provide a back-up system for determining vehicle location. Simple and efficient systems are also desirable when used as the primary positioning systems. The subject invention provides a simple and efficient system for determining the location of a vehicle in a base reference frame. One or more targets are located at predefined positions with respect to the base reference frame. A target sensing device determines a position of one of the one or more targets with respect to the vehicle. A device determines an estimated vehicle position. A vehicle locating device determines the location of the vehicle with respect to the base reference frame in response to the position of the target with respect to the vehicle and the estimated vehicle position.

5 Claims, 6 Drawing Sheets

U.S. PATENT DOCUMENTS

| | | | |
|---|---|---|---|
| 4,442,491 | 4/1984 | Othausen, Jr. | 364/454 |
| 4,533,918 | 8/1985 | Virnot | 343/451 |
| 4,642,786 | 2/1987 | Hansen | 364/559 |
| 4,647,784 | 3/1987 | Stephens | 250/561 |
| 4,665,401 | 5/1987 | Garrard et al. | 342/75 |
| 4,688,176 | 8/1987 | Hirata | 364/449 |
| 4,714,339 | 12/1987 | Lau et al. | 356/4.5 |
| 4,727,492 | 2/1988 | Reeve et al. | 364/424 |
| 4,769,700 | 9/1988 | Pryor | 358/107 |
| 4,811,228 | 3/1989 | Hyyppa | 364/424.02 |
| 4,847,769 | 7/1989 | Reeve | 364/424.02 |
| 4,853,863 | 8/1989 | Cohen et al. | 364/460 |
| 4,901,084 | 2/1990 | Huguenin et al. | 342/179 |
| 4,912,753 | 3/1990 | Evans, Jr. | 364/513 |
| 4,918,607 | 4/1990 | Wible | 364/424.02 |
| 4,935,871 | 6/1990 | Grohsmeyer | 364/424.02 |
| 4,951,213 | 8/1990 | Baxter et al. | 364/456 |
| 4,951,214 | 8/1990 | Hollister | 364/460 |
| 5,019,968 | 5/1991 | Wang et al. | 364/200 |
| 5,024,942 | 8/1991 | Brimberg | 356/1 |
| 5,047,778 | 9/1991 | Cofield et al. | 342/97 |
| 5,087,916 | 2/1992 | Metzdorff et al. | 342/64 |
| 5,109,345 | 4/1992 | Dabney et al. | 364/459 |
| 5,170,352 | 12/1992 | McTamaney | 364/424.02 |
| 5,247,306 | 9/1993 | Hardange et al. | 342/70 |
| 5,375,059 | 12/1994 | Kyrtsos et al. | 364/449 |
| 5,390,125 | 2/1995 | Sennott et al. | 364/449 |

OTHER PUBLICATIONS

Martin Marietta Information & Communications Systems, pp. 912–917, dated 1988.

Article entitled "Autonomous Navigation For Mobile Robot Vehicles Over Hilly Terrain using Rangefinding Measurements" by C. N. Shen, U.S. Army, pp. 135–144.

Article entitled "Car obstacle avoidance radar at 94GHz" by P. Mallinson, pp. 297–302 dated 1989.

Article entitled "Obstacle avoidance on roadways using range data", by R. Terry Dunlay and David G. Morgenthaler, Martin Marietta Denver Aerospace Computer Vision Group, pp. 110–116 dated 1976.

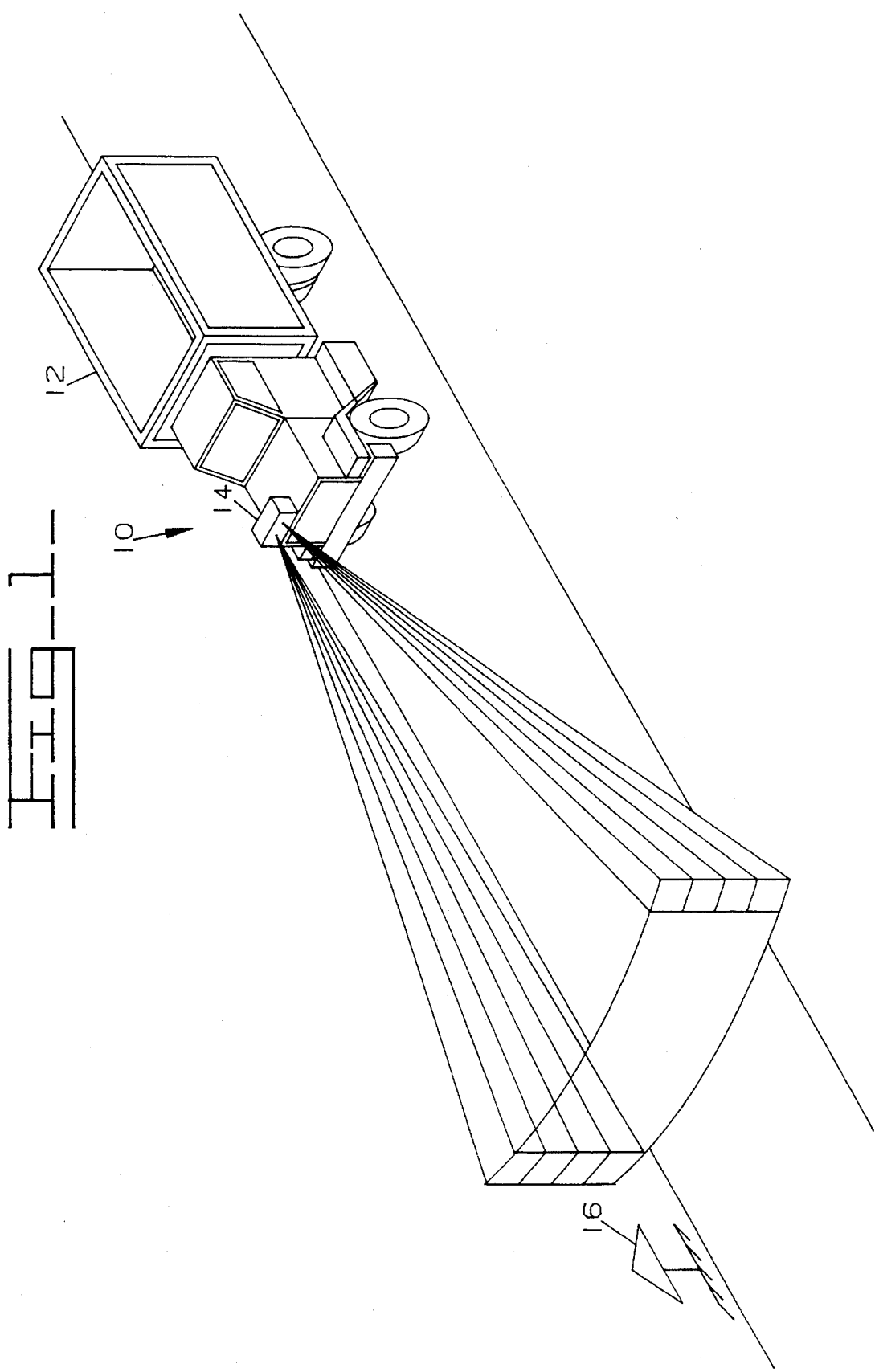

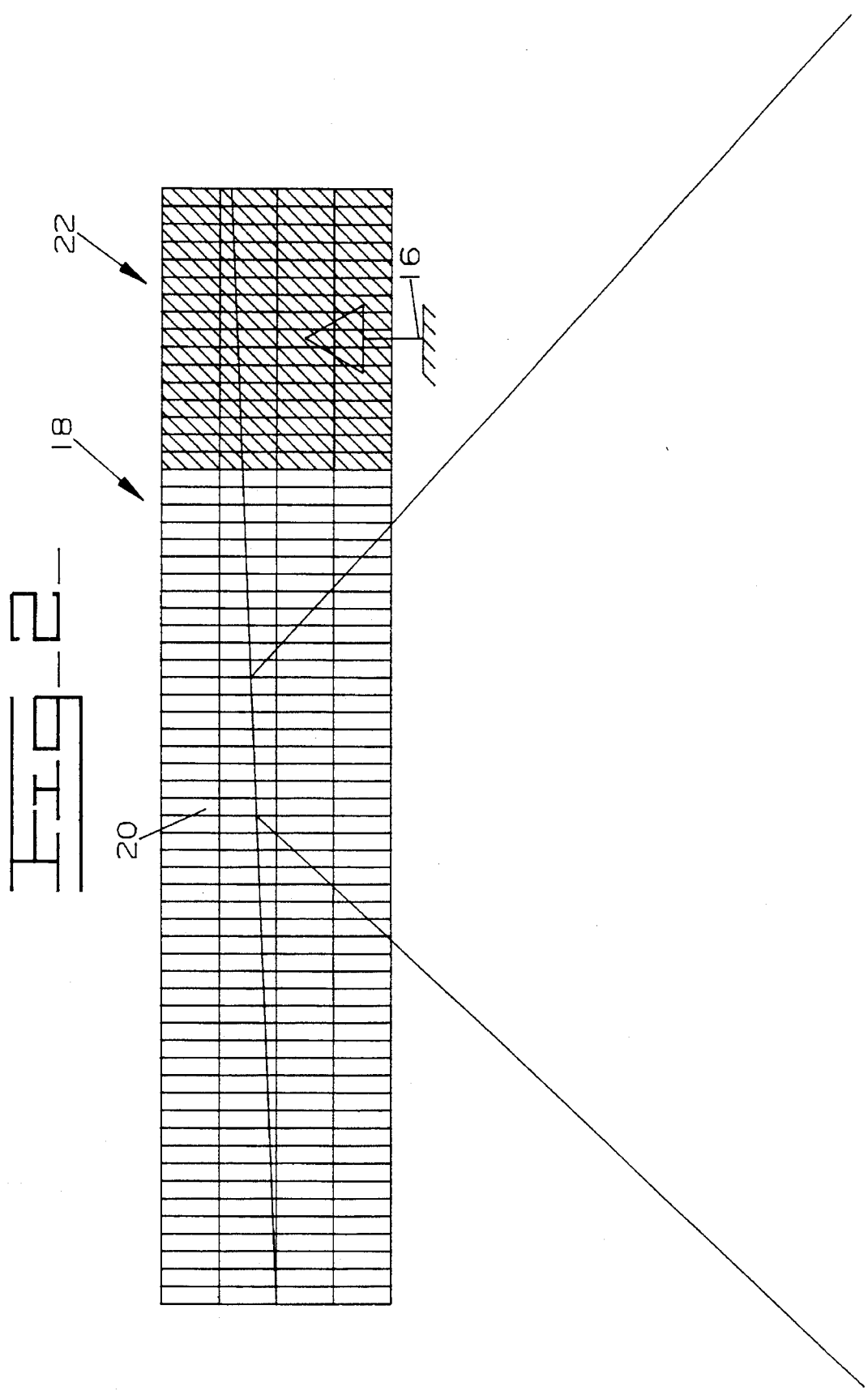

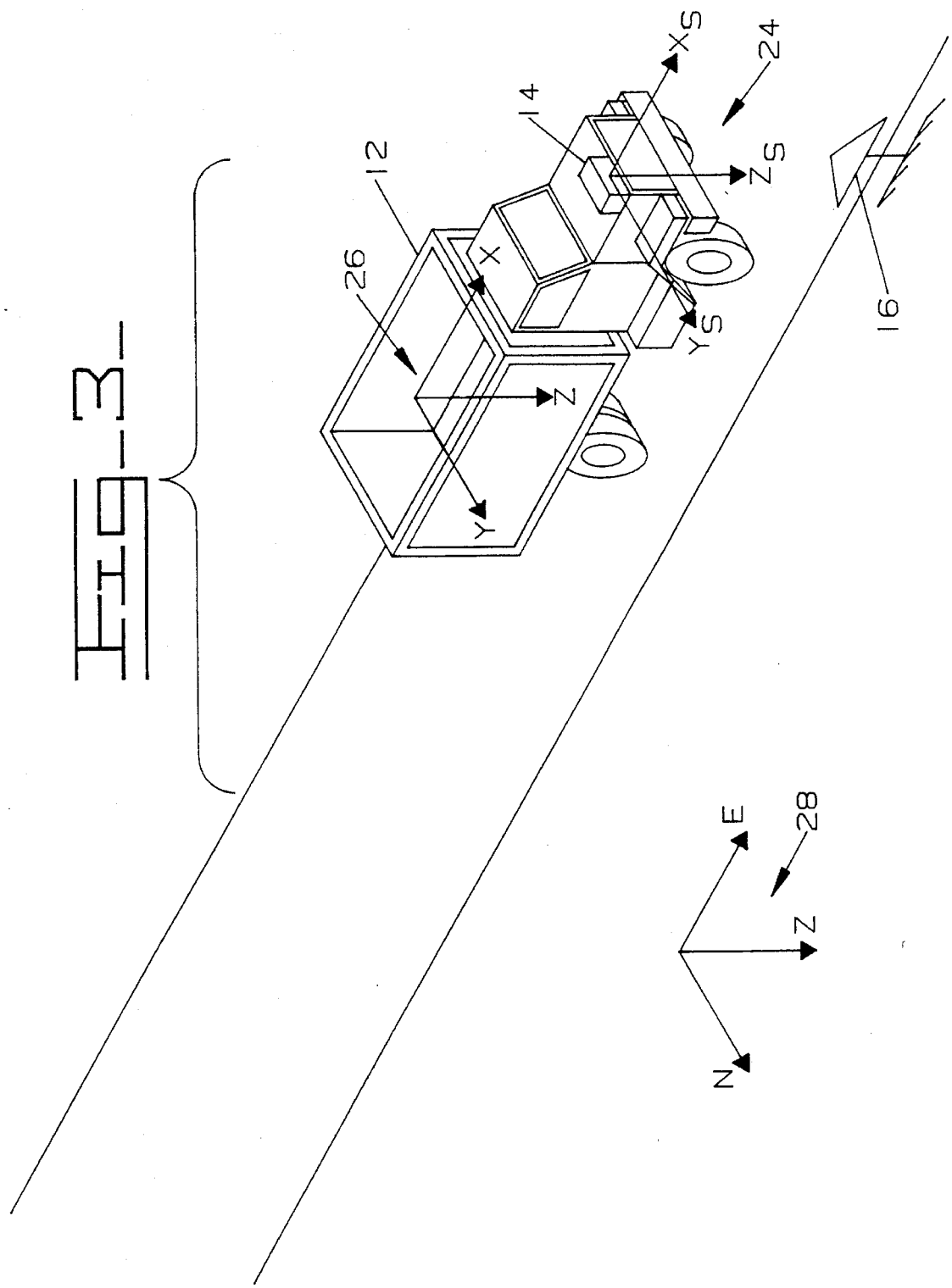

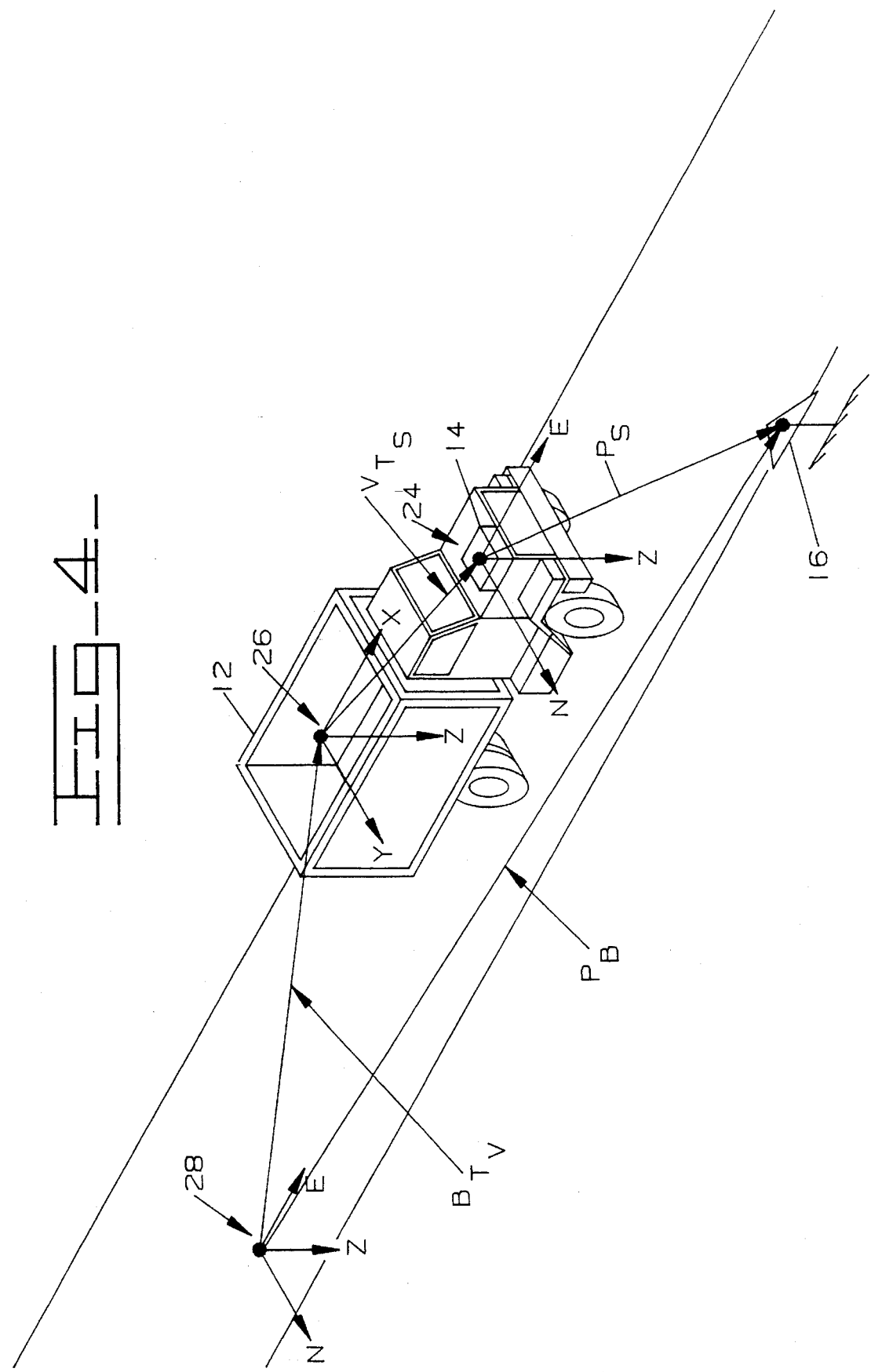

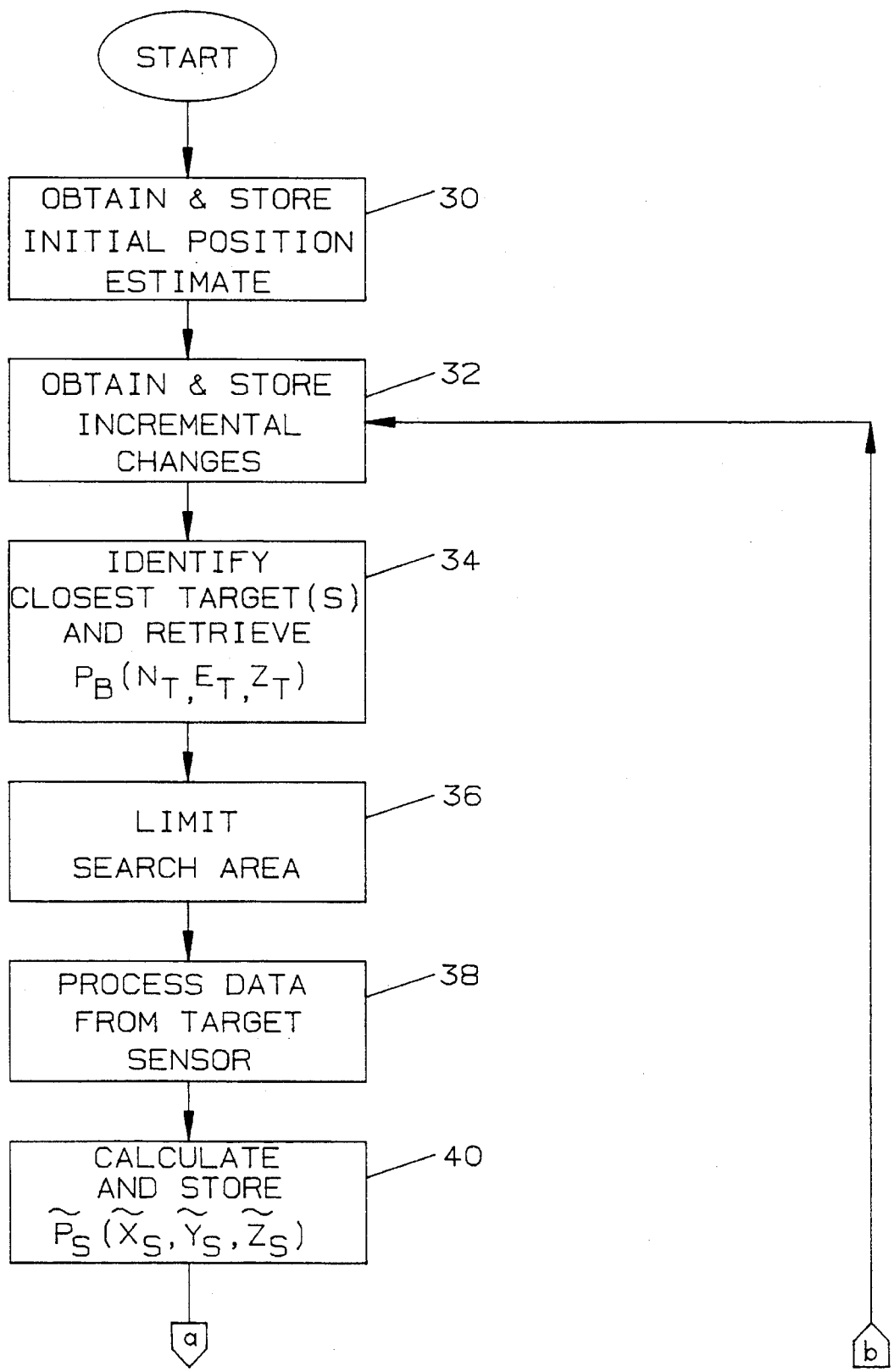

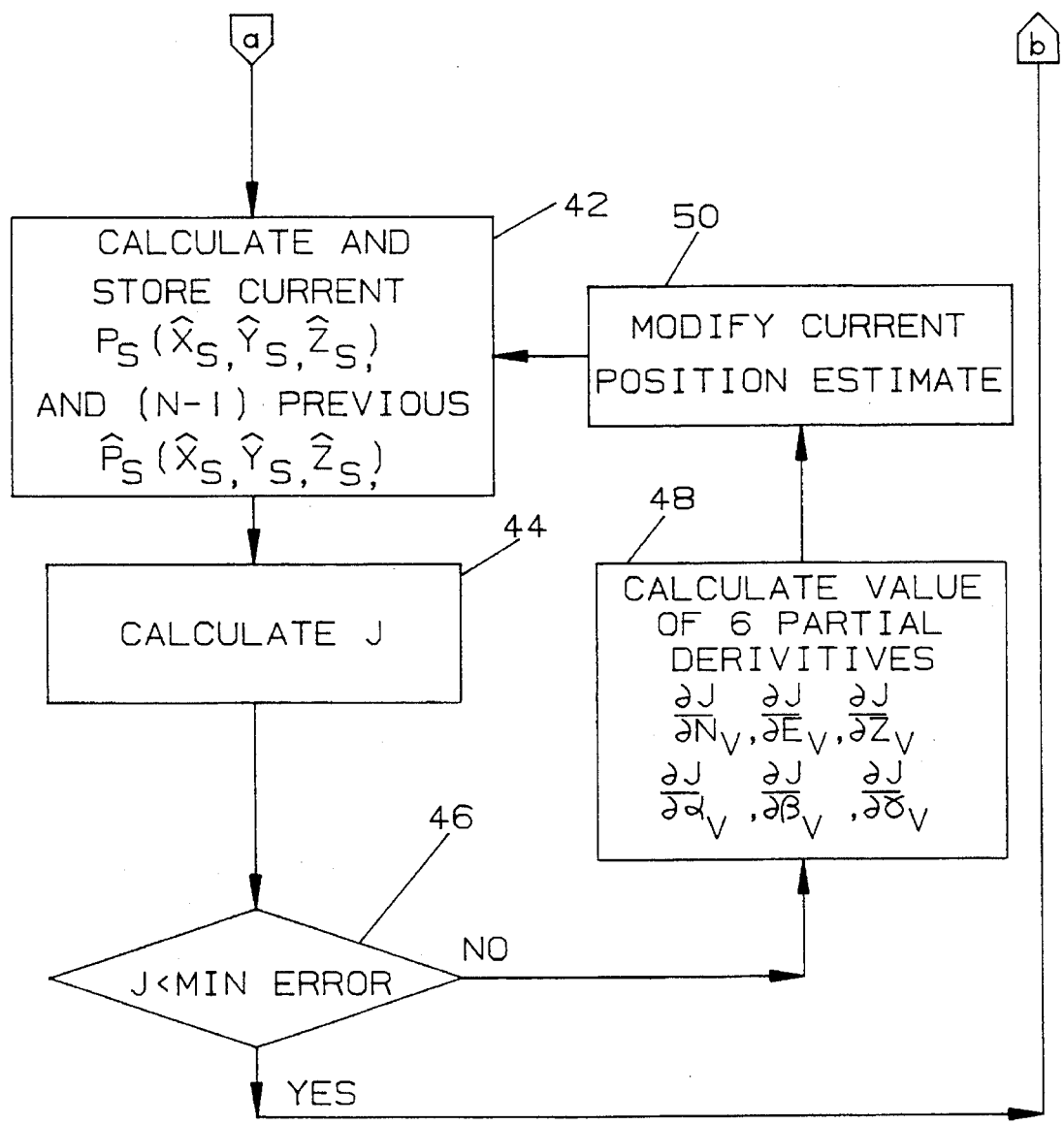
Fig_5b_

METHOD AND APPARATUS FOR DETERMINING THE LOCATION OF A VEHICLE

This is a file wrapper continuation of application Ser. No. 07/942,000, filed Sep. 8, 1992, now abandoned.

TECHNICAL FIELD

This invention relates generally to a navigation system, and more particularly to an apparatus and method for determining the location of a vehicle in a three-dimensional reference frame.

BACKGROUND ART

Autonomous vehicles have been developed to perform a number of functions including carrying payloads in factories and mines and providing reconnaissance information in military and space applications. A necessary feature of the navigation system on-board such vehicles is a positioning system for determining the location of the vehicle on the surface of the earth or with respect to some predefined reference frame. Conventional positioning systems include global positioning systems (GPS), inertial-based positioning systems, vision-based positioning systems, and dead-reckoning systems.

In a global positioning system, a number of satellites are placed in orbit around the Earth. The GPS satellites are designed to transmit electromagnetic signals. From these electromagnetic signals, the absolute position of any receiver at or near the surface of the Earth can be determined. Typically, signals from at least four of the GPS satellites in the field of view of an Earth receiver are used to accurately determine the receiver position.

The accuracy of the GPS is affected by the number of GPS satellites transmitting signals to which the Earth receiver is effectively responsive, the variable amplitudes of the received signals. When one or more of the GPS satellites are not functioning properly, the accuracy of the position estimates is degraded. Furthermore, if the electromagnetic signals from the satellites are blocked such as when the vehicle is operating in a deep open-pit mine or in a tunnel, the accuracy of the global positioning system is reduced.

In addition to GPS, it is known in the conventional art to use inertial reference units (IRUs) in navigation systems to obtain position estimates of vehicles. Such an IRU obtains specific-force measurments from accelerometers in a reference coordinate frame which is stabilized by gyroscopes. An IRU can be of several types, including for example, laser, mechanical, or fiber optic. In an unaided navigation system using an IRU, the specific force (corrected for the effects of the Earth's gravity) as measured by an accelerometer is integrated into a navigation mathematical equation to produce the vehicle's position and velocity.

The instrument measurements of the IRU may be specified in a different rectangular coordinate frame than the reference navigation frame, depending on the platform implementation. The most commonly used reference navigation frame for near Earth navigation is a local-level frame.

The gyroscopes and the accelerometers associated with the IRU are typically mounted directly on the vehicle body. They measure the linear and angular motion of the vehicle relative to inertial space. The motion is expressed in vehicle coordinates. Therefore, it is necessary to first compute the altitude of the vehicle to the referenced navigation frame. Then, the computed altitude is used to transform the accelerometer measurements into the reference frame.

The performance of navigation systems using IRUs is limited by errors contributed by the various constituent sensors within the IRUs. Gyroscopes drift. Accelerometers have inherent biases. Further, errors are contributed from improper scale factors and improper IRU alignment angles. Typically, the preceding errors cause inaccuracies in the estimates of vehicle positions, velocity, and altitude, which accumulate over time as a vehicle mission progresses. To some extent, the errors are dependent on user dynamics.

If a very accurate navigation system is required for a vehicle, high precision gyroscopes and accelerometers can be utilized to satisfy that need. However, such high precision equipment increase the complexity and costs of the vehicle.

Autonomous vehicle navigation systems also exist which rely on positioning based on visual sensing. For instance, vision-based positioning is used in the Martin Marietta Autonomous Land Vehicle, as described in "Obstacle Avoidance Perception Processing for the Autonomous Land Vehicle," by R. Terry Dunlay, IEEE, CH2555-1/88/0000/0912, 1988.

Some of the vision based positioning systems use fixed guide lines or markings on a factory floor, for example, to navigate from point to point. Other positioning systems involve pattern recognition by complex hardware and software. Still other systems, known as "dead-reckoning" systems, navigate by keeping track of the vehicle's position relative to a known starting point. This tracking is performed by measuring the distance the vehicle has travelled and monitoring the vehicle direction from the starting point. The preceding autonomous navigation systems suffer from numerous drawbacks and limitations. For instance, if a navigation system on a vehicle fails to recognize where the vehicle has been, or miscalculates the vehicle's starting point, then the navigation system will be unable to accurately direct the vehicle to reach its ultimate destination.

Moreover, because errors in position estimates of vehicles have a tendency to accumulate over time in conventional autonomous navigation systems, the navigation systems require frequent and time-consuming updates of actual position. Such a system for updating a dead-reckoning navigation system is disclosed in "Blanche: An Autonomous Robot Vehicle for Structured Environments", by Ingemar J. Cox, IEEE, CH2555-1/88/0000/0978, 1988. The disclosed navigation system uses a laser range-finder mounted on the vehicle in conjunction with bar-coded targets mounted in an operating area to update an odometer-based dead-reckoning system. Such a system has the disadvantage of being usable only in a two-dimensional operating area.

The present invention is directed to overcoming one or more of the problems set forth above.

DISCLOSURE OF THE INVENTION

The invention avoids the disadvantages of known vehicle locating systems and provides an efficient and simple system for improving the resolution of vehicle position estimates obtained from other positioning systems. The subject invention also may be used independently of other vehicle positioning systems to serve as the primary positioning system of the vehicle. Alternatively, the present invention may act as a back-up positioning system to provide vehicle position estimates when the primary positioning system is non-functional.

In one aspect of the present invention, an apparatus for determining the location of a vehicle in a three-dimensional base reference frame is provided. One or more targets are located at predefined positions with respect to the base reference frame. A target sensing device determines a position of one of the one or more targets with respect to the vehicle. A device determines an estimated vehicle position and a vehicle locating device determines the location of the vehicle with respect to the base reference frame in response to the position of the target with respect to the vehicle and the estimated vehicle position.

In another aspect of the invention, a method for determining the location of a vehicle in a base reference frame is provided including the steps of determining a current vehicle position, directing electromagnetic energy toward one or more targets and receiving electromagnetic energy reflected by the one or more targets, determining a measured target position, calculating an estimated target position with respect to the vehicle, and determining the location of the vehicle with respect to the base reference frame.

The invention also includes other features and advantages which will become apparent from a more detailed study of the drawings and specification.

BRIEF DESCRIPTION OF THE DRAWINGS

For a better understanding of the present invention, reference may be made to the accompanying drawings, in which:

FIG. 1 is a diagrammatic view of a vehicle in connection with an electromagnetic scanner;

FIG. 2 is an illustration of a function of a portion of an embodiment of the present invention;

FIG. 3 is an illustration of a plurality of coordinate systems;

FIG. 4 is an illustration of a plurality of vectors and transforms in the plurality of coordinate systems; and FIG. 5 is a flow chart of an algorithm used in an embodiment of the present invention.

BEST MODE FOR CARRYING OUT THE INVENTION

A vehicle positioning system embodying certain principles of the present invention is generally indicated by the numeral 10 in FIG. 1. A work vehicle 12 includes an electromagnetic target sensor 14 for sensing the position of targets 16 with respect to the target sensor 14. Advantageously, targets 16 are used that give a good radar return, such as a corner reflector, or other type of metal target. These targets 16 are placed in a vehicle work area and their location is surveyed by some means so that their location within a site specific, base coordinate system 28, is accurately known. Alternatively, the global coordinates of the targets 16 (latitude and longitude) are known.

The vehicle positioning system 10 locates the target 16 with respect to the target sensor 14 by processing data from the target sensor 14. The range from the target sensor 14 to the target 16 and the elevation and azimuth of the target 16 with respect to the target sensor 14 are determined by processing target sensor data in a manner well-known in the art.

In a preferred embodiment, the target sensor 14 is a frequency modulated continuous wave (FMCW) millimeter-wave radar unit operating at a center frequency of 77 GHz. At each antenna position in the target sensor 14, RF energy centered at approximately 77 GHz is transmitted in an upramp portion and a downramp portion. The received signal is mixed with this transmitted signal and an intermediate frequency (IF) signal results. When radar energy is reflected off objects in the radar's field of view, the range to these objects is directly proportional to frequencies in the IF signal. This IF signal is run through an $R^4$ filter and an anti-aliasing filter. The portion of the IF signal that corresponds to upramp time and the downramp time are digitized and sent to a processor. Data taken in each pixel shown in FIG. 2 consists of two sets of digitized data, one corresponding to the upramp of the transmitted signal and one to the downramp. The processor preferably contains digital signal processors to perform a fast-fourier transform (FFT) to change the IF signal from the time domain to the frequency domain. Since the target is designed to return a very large amount of radar energy relative to the background, it will appear as a spike in a plot of power versus frequency of either portion of the ramps for the IF signal. The frequency at the peak of this spike can be readily extracted from the upramp and downramp IF signals via various thresholding means. The range to the target can be obtained by averaging the frequencies obtained from thresholding the two signals and solving the following equation for range, R:

$$fr = \frac{4Rfm\Delta f}{C}$$

fr=frequency of peak point of the target obtained by thresholding the FFT of the IF signal
fm=modulation frequency
$\Delta f$=range of frequency modulation
C=speed of light By averaging the frequencies for the target obtained from each ramp, the effect of the doppler shift caused by vehicle movement is eliminated. The doppler shift causes an erroneous result to be obtained for range when using the IF signal produced during only one of the ramps.

The target sensor 14 scans a beam in front of the vehicle 12. This beam preferably has a 1 degree width in azimuth, with four beams stacked in elevation giving an elevation field-of-view of 8 degrees. It should be understood, however, that the precise configuration of the target sensor scans may be significantly altered without deviating from the spirit of the invention.

As shown in FIG. 2, the target sensor 14 has a field of view 18 that is separated into a plurality of individual pixels 20. Each pixel 20 corresponds to a unique azimuth and elevation position in the field of view of the radar.

The vehicle positioning system 10 preferably verifies that the object found by the target sensor 14 in a specific pixel 20 is the target desired. This requires comparing the range to the target 16 with an expected range calculated by using an estimate of the target position with respect to the target sensor 14, and by looking at the power levels of other objects found in nearby pixels 20 and labeling the object with the strongest power level as the target 16. A further check that can be performed at this stage is to check the doppler shift of the target 16 and use vehicle speed to verify that the shift is only caused from the vehicle movement. If this is not the case, then the object must be moving and can be eliminated as a target 16.

The processing can be performed more efficiently by reducing the amount of data from the target sensor 14 that is being processed. This is accomplished by defining a limited search area 22 in the target sensor field of view 18. The limited search area 22 is defined in response to an estimated vehicle position and the presurveyed locations of the targets 16 that are stored in the vehicle positioning system 10. The limited search area 22 is chosen to be the area in the target sensor field of view 18 in which the target 16 is expected to be located with respect to the target sensor 14. The data processed is graphically illustrated in FIG. 2 by the shaded portion 22.

It should be appreciated by those skilled in the art that the present invention does not require this exact type of target sensor 14. The same information could be obtained from radars configured in other ways and with laser scanners.

With a laser scanner, the location of targets could be accurately obtained, however, laser scanners do not work as well in outdoor environments. If the invention is to be used in an outdoor environment, a sensor that functions in rain, snow, dusty and foggy conditions is required. Advantageously, radar in the millimeter wavelength range of the electromagnetic spectrum is used because of its ability to penetrate rain, snow, dust, fog, and other similar phenomena.

Referring now to FIG. 3, three coordinate systems relating to the invention are illustrated. The origin of a three-dimensional sensor coordinate system 24 is located at a predefined location with respect to the target sensor 14. In the preferred embodiment, the origin of the sensor coordinate system 24 is located at a central point in the area of the target sensor 14 in which electromagnetic energy is emitted and received.

The origin of a three-dimensional vehicle coordinate system 26 is located at a predefined location with respect to a geometric or gravitational center of the vehicle 12. In the preferred embodiment, the vehicle coordinate system 26 is located at the center of the rear axle of the vehicle 12.

The origin of a three-dimensional base coordinate system 28 is located at a predefined location in an area in which the vehicle 12 is operating. The precise location of the sensor, vehicle, and base coordinate systems 24,26,28 may be modified without deviating from the invention.

Referring now to FIG. 4, the vehicle, sensor, and base coordinate systems 24,26,28 are graphically illustrated in conjunction with the vehicle 12 and a target 16. A base-to-vehicle translation $^{B}T_{V}$ and a vehicle-to-sensor translation $^{V}T_{S}$ are graphically illustrated.

The position and orientation of the vehicle coordinate system 26 in the base coordinate system 28 is represented as a homogeneous transform, $^{B}T_{V}$, from the base coordinate system to the vehicle's coordinate system including both the linear displacement and the angular displacement of the vehicle coordinate system with respect to the base coordinate system. Thus the homogeneous transform is advantageously described by six parameters, $(E_V, N_V, Z_V, \alpha_V, \beta_V, \gamma_V)$.

A homogeneous transform is well known in the field of robot kinematics and computer graphics. It is a 4×4 matrix that contains a 3×3 direction cosine matrix in the upper left hand corner and 4×1 column vector in the rightmost column. It has the property that it allows a translation and rotation of an object from one coordinate system to another. The position and orientation of the sensor coordinate system 24 in the vehicle coordinate system 26 can also be represented as a homogenous transform, $^{V}T_{S}$, advantageously described by six parameters.

The position of the target 16 with respect to the target sensor 14 is determined by the vehicle positioning system 10 in response to data produced by the target sensor 14. The position of the target 16 in the sensor coordinate system 24 is represented as a vector, $P_S$. The target position is not represented as a transform because the orientation of the target 16 is not easily measured with the target sensor 14.

The other vector that completes the circle of transformations and vectors is $P_B$. $P_B$ is a vector in the base coordinate frame; the information for $P_B$ is obtained by presurveying the target and consists of the target description in the base coordinate system $(N_T, E_T, Z_T)$.

Using the two transforms $^{B}T_V$ and $^{V}T_S$, and the vector $P_B$, an equation can be written for $P_S$:

$$P_S = [^{V}T_S]^{-1} [^{B}T_V]^{-1} P_B$$

The vector $P_S$ in the sensor coordinate frame is formed by the following equations obtained in response to processed data from the target sensor 14 and represents a measured position of the target 16 with respect to the target sensor 14:

$$\tilde{P}_S = \begin{bmatrix} \tilde{X}_s \\ \tilde{Y}_s \\ \tilde{Z}_s \\ 1 \end{bmatrix} = \begin{bmatrix} R\cos(\Theta)\cos(\Phi) \\ R\sin(\Theta)\cos(\Phi) \\ R\sin(\Theta)\cos(\Phi) \\ 1 \end{bmatrix}$$

where:
R=range to the target;
$\phi$=elevation angle; and
$\theta$=azimuth angle.

The right side of the equation above can be reduced to the following 4×1 column vector representing an estimated position of the target 16 with respect to the target sensor 14:

$$\hat{P}_S = \begin{bmatrix} \hat{X}_s \\ \hat{Y}_s \\ \hat{Z}_s \\ 1 \end{bmatrix} = \begin{bmatrix} n_x N_t + n_y E_t + n_z Z_t - \bar{p} \times \bar{n} - X_{off} \\ o_x N_t + o_y E_t + o_z Z_t - \bar{p} \times \bar{o} - Y_{off} \\ a_x N_t + a_y N_t + o_z Z_t - \bar{p} \times \bar{o} - Z_{off} \\ 1 \end{bmatrix}$$

where:

$\begin{bmatrix} n_x \, o_x \, a_x \\ n_y \, o_y \, a_y \\ n_z \, o_z \, a_z \end{bmatrix} =$ are the elements of the rotation matrix. Each element contains various combinations of trig functions of the angles, $\alpha_V, \beta_V, \gamma_V$ as is well-known in the art;

$\bar{P} = \begin{bmatrix} E_v \\ N_v \\ Z_v \end{bmatrix} =$ a 3 × 1 column vector describing the translation of the vehicle in 3-D space;

$\begin{bmatrix} N_t \\ E_t \\ Z_t \end{bmatrix} =$ 3 components of the target vector, $P_B$, in the base coordinate frame; and $X_{off}, Y_{off}, Z_{off} =$ translational elements in the $^{V}T_s$ homogeneous transform.

Referring now to FIG. 5, a flow chart of an algorithm incorporated in a preferred embodiment of the present invention is shown. An initial position estimate $(E_V, N_V, Z_V, \alpha_V, \beta_V, \gamma_V)$ for the vehicle in the base coordinate system 28 is determined 30 by an on-board positioning system (not shown). In the preferred embodiment, the on-board positioning system includes an inertial reference unit and a global positioning unit to provide an estimated position of the vehicle in the base coordinate system 28.

In another embodiment, an inertial reference unit is used in connection with the algorithm of FIG. 5 to provide the estimates of vehicle position. In this case, the vehicle 12 starts from a presurveyed point and targets 16 are positioned to be visible by the target sensor 14 at all times or visible within 30 seconds of vehicle travel time. The presurveyed point is stored in memory as the initial position estimate. The position and orientation information is updated as the vehicle moves within the work area in accordance with the invention.

In an alternative embodiment, a simple, low-cost system is provided and comprises rate sensors on the heading, pitch, and roll axis of the vehicle 12 and a distance over ground measurement from an odometer or a speed over ground sensor. The vehicle 12 starts from a known point and targets 16 are either visible by the target sensor 14 at all times or visible within 30 seconds of vehicle travel time. The pre-surveyed point is stored in memory as the initial position estimate. The position and orientation information is updated as the vehicle moves within the work area in accordance with the invention.

Once the initial position estimate is obtained and stored 30, incremental position changes are obtained from an inertial reference unit, rate sensor and odometer, or the like and stored 32 in memory. The incremental position changes include data representative of movement of the vehicle from the initial position estimate in the vehicle coordinate system in the X, Y, and Z directions and about the roll, pitch, and yaw axes of the vehicle 12. The incremental position changes measured by the inertial reference unit, rate sensor and odometer, or the like are typically highly accurate over the time frame of interest which is preferably 1-5 seconds. A current position estimate of the vehicle 12 in the base coordinate system 28 is calculated and stored in memory in response to the initial position estimate and the incremental position changes.

The incremental position change is stored in memory along with preferably (N-1) previous incremental position changes where N is equal to the number of measured target positions obtained in a predefined measurement period that is preferably one to two seconds in duration. In the preferred embodiment, N is in the range of 5 to 10, however, any value for N that is equal to two or more is usable in connection with the invention.

In response to the current position estimate, one or more targets 16 that are expected to be in the target sensor field of view 18 are identified 34 and the location of the identified target(s) in the base coordinate system 28, $P_B(N_T, E_T, Z_T)$, is retrieved from memory.

An approximate location of the target(s) 16 with respect to the target sensor 14 is determined and the data processed from the target sensor 14 is restricted 36 to that data corresponding to the limited search area 22 in the target sensor field of view 18 in which a target 16 is expected to be located. The search for the target is performed in the limited search area 22 illustrated by the shaded portion in FIG. 2.

The data produced by the target sensor 14 in response to the reflected electromagnetic radiation in the limited search area 22 is processed 36 in a manner well-known in the art and a measured target location $P_S$ in the sensor coordinate system 24 is calculated 40 as described above in response to the processed data. In the preferred embodiment, the measured target location $P_S$ is calculated in response to the measured range, elevation, and azimuth of the target 16 with respect to the target sensor 14. The measured target location is stored in memory along with preferably (N-1) previous measured target locations where N is equal to the number of measured target positions obtained in a predefined measurement period that is preferably one to two seconds in duration. In the preferred embodiment, N is in the range of 5 to 10, however, any value for N that is equal to two or more is usable in connection with the invention. If N=2 a unique solution to the above described equations is achieved, however, an analytical solution to these equations is not used; a gradient descent method is used to iteratively solve for the six vehicle position parameters. Accuracy improves as N increases since measurement errors from the target sensor 14 average out.

N estimated target locations $P_S$ are calculated and stored in memory 42. In the preferred embodiment, one of the N estimated target locations is calculated to correspond to the location of the target in the sensor coordinate system 24 while the vehicle is located and oriented at the current position estimate. The remaining (N-1) estimated target locations are calculated in response to the current position estimate and the incremental position changes to correspond to the location of the target 16 in the sensor coordinate system 24 while the vehicle 12 is located and oriented at each of the (N-1) previous vehicle position estimates.

An objective function, J, is calculated in response to the N measured and estimated target locations. To improve the estimated vehicle position, the objective function is formed representing the squared error between the measured and estimated target locations in the sensor coordinate frame. This error is summed over the last N readings from the target sensor 14. This function follows:

$$J = \frac{1}{2} \sum_n [(\tilde{X}_s - \hat{X}_s)^2 + (\tilde{Y}_s - \hat{Y}_s) - (\tilde{Z}_s - \hat{Z}_s)^2]$$

In the event that J is less than a minimum error, the current position estimate is considered to be an accurate estimate of the position of the vehicle 12 and control is passed back to block 32 of the algorithm illustrated in FIG. 5.

In the event that J is greater than a minimum error, the current position estimate is recalculated. As is well-known in the art, a gradient descent method is used to change the estimates of the vehicle's position to decrease the error between the measured and estimated target locations. The gradient descent method includes an iterative process in which the partial derivatives of J with respect to each vehicle parameter, are calculated and analyzed to determine a new value for each vehicle parameter.

In the preferred embodiment, the system iterates until the value of J is below the minimum error, or until J changes by too small of an amount to continue the search. The iterations also end because of time constraints on the software and in this case the vehicle position and orientation with the lowest value of J will be used. In the preferred embodiment, the system will be allowed to iterate for 200 milliseconds using an N of 5-10 representing the number of readings taken over the last one to two seconds.

Industrial Applicability

The operation of an embodiment of the vehicle positioning system 10 is best described in relation to its use as a secondary or primary positioning system in connection with a navigation system for an autonomous work vehicle. The present invention is used most advantageously in connection with a vehicle 12 operating in a three-dimensional work area. When used as a secondary positioning system, the position estimates of the primary positioning system are improved when augmented by the present invention. When used as a primary positioning system, accurate three-dimensional position estimates are provided by a simple and economical system.

When the invention is used to supplement a primary positioning system, for example a global positioning system and an inertial reference unit, the initial position estimates of the vehicle 12 in the base coordinate system 28 are provided at regular intervals by the primary positioning system. The current position estimates produced by the present invention are used by the primary positioning system to improve position resolution and accuracy.

The advantages of the present invention are particularly apparent in the event that the accuracy of the primary positioning system is reduced. Such accuracy reductions typically occur as a result of the GPS receiver in the primary positioning system not receiving one or more signals from the satelites in the global positioning systems. This may occur due to satellite malfunctions, electromagnetic interference, or the electromagnetic signals from the satellites being blocked such as when the vehicle is operating in a deep open-pit mine or in a tunnel. Similarly, if the primary positioning system becomes non-functional, the subject invention may serve as a back-up positioning system.

The present invention is also used as a primary positioning system. In this case, the vehicle 12 begins operation at a presurveyed location that is stored as the initial position estimate. An inertial reference unit is used to provide data representative of incremental position changes. Alternatively, a simple, low-cost system for providing incremental position change information is included and comprises rate sensors on the heading, pitch, and roll axes of the vehicle 12 and a distance over ground measurement from an odometer or a speed over ground sensor. The vehicle 12 starts from the presurveyed point and targets 16 are either visible by the target sensor 14 at all times or visible within 30 seconds of vehicle travel time. The current position estimate is updated as the vehicle moves within the work area in accordance with the invention.

Other aspects, objects, advantages and uses of this invention can be obtained from a study of the drawings, disclosure, and appended claims.

We claim:

1. An apparatus for determining the location of a vehicle in a base reference frame having three-dimensions, comprising:

a target being located at a predefined fixed position with respect to the three-dimensional base reference frame;

radar sensing means for delivering electromagnetic millimeter wave radiation and receiving a reflection of said electromagnetic millimeter wave radiation, said radar sensing means being connected to said vehicle;

means for determining a measured location in three dimensional space of said target within a preselected field of view of said radar sensing means based on the received reflection;

means for delivering global positioning signals from a remote location;

incremental position sensing means for sensing the orientation of the vehicle at a current vehicle position in three-dimensional space within the base reference frame and delivering an orientation signal, said incremental position sensing means being mounted on the vehicle;

means for receiving said global position and orientation signals and estimating a current vehicle position in three-dimensional space within the base reference frame based on said global positioning and orientation signals;

vehicle positioning means for correcting the estimated current vehicle position with respect to the three-dimensional base reference frame based on the location of said target within the field of view of said radar sensing means and the orientation of said vehicle.

2. An apparatus, as set forth in claim 1, wherein said incremental position means includes an inertial reference unit.

3. An apparatus, as set forth in claim 1, wherein the orientation determined by said incremental position sensing means includes roll, pitch, and yaw of the vehicle.

4. An apparatus, as set forth in claim 1, wherein said means for estimating a current vehicle position includes means for determining an initial vehicle position, said incremental position determining means senses changes in the three-dimensional position and orientation of the vehicle, and said vehicle positioning means includes means for calculating current and previous estimated target locations in response to said vehicle being at said current vehicle position and orientation.

5. An apparatus, as set forth in claim 4, wherein said vehicle positioning means includes means for comparing said estimated and measured target locations.

\* \* \* \* \*